(12) United States Patent
Greene et al.

(10) Patent No.: US 7,429,421 B2
(45) Date of Patent: *Sep. 30, 2008

(54) COATED CLUMPING LITTER COMPRISING NON-SWELLING PARTICLES

(75) Inventors: Phillip Brent Greene, Jackson, MO (US); James Dean Job, Kelso, MO (US); James Max Kearbey, St. Louis, MO (US); Cesar J. Mauras, Croton-on-Hudson, NY (US); W. Craig Marx, St. Louis, MO (US)

(73) Assignee: Nestec, S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/883,164

(22) Filed: Jul. 1, 2004

(65) Prior Publication Data

US 2005/0056229 A1 Mar. 17, 2005

Related U.S. Application Data

(63) Continuation-in-part of application No. 10/068,058, filed on Feb. 5, 2002, now Pat. No. 6,887,570.

(51) Int. Cl.
*B32B 5/16* (2006.01)
*A01K 29/00* (2006.01)

(52) U.S. Cl. .................. 428/403; 119/173; 428/404

(58) Field of Classification Search .............. 119/171, 119/173; 428/403, 404
See application file for complete search history.

(56) References Cited

U.S. PATENT DOCUMENTS

| | | | |
|---|---|---|---|
| 2,531,427 A | 11/1950 | Hauser | |
| 3,586,478 A | 6/1971 | Neumann | |
| 3,789,797 A | 2/1974 | Brewer | |
| 4,036,928 A | 7/1977 | Valenta | |
| 4,085,704 A | 4/1978 | Frazier | |
| 4,108,932 A | * 8/1978 | Takewell et al. | 264/37.29 |
| 4,157,696 A | 6/1979 | Carlberg | |
| 4,163,674 A | 8/1979 | Been | |
| 4,187,803 A | 2/1980 | Valenta | |
| 4,278,047 A | 7/1981 | Luca | |
| 4,407,231 A | 10/1983 | Colborn et al. | |
| 4,459,368 A | 7/1984 | Jaffee et al. | |
| 4,622,920 A | 11/1986 | Goss | |
| 4,641,605 A | 2/1987 | Gordon | |
| 4,689,297 A | 8/1987 | Good et al. | |
| 4,704,989 A | 11/1987 | Rosenfeld | |
| 4,976,977 A | 12/1990 | Johnson et al. | |
| 5,062,383 A | 11/1991 | Nelson | |
| 5,094,189 A | 3/1992 | Aylen et al. | |
| 5,101,771 A | 4/1992 | Goss | |
| RE33,983 E | 7/1992 | Hughes | |

(Continued)

FOREIGN PATENT DOCUMENTS

EP 0 378 421 7/1990

(Continued)

*Primary Examiner*—H. T Le
(74) *Attorney, Agent, or Firm*—James B. Surber; Bryan Cave, LLP

(57) ABSTRACT

A clumping animal litter is disclosed that includes a non-swelling particle and a swelling agent coated on the surface of the non-swelling particle. In one embodiment, agglomerated non-swelling clay fines are coated.

16 Claims, 4 Drawing Sheets

U.S. PATENT DOCUMENTS

| | | | |
|---|---|---|---|
| 5,129,365 A | | 7/1992 | Hughes |
| 5,146,877 A | | 9/1992 | Jaffee et al. |
| 5,169,307 A | * | 12/1992 | Frye .................... 432/14 |
| 5,176,107 A | | 1/1993 | Buschur |
| 5,188,064 A | | 2/1993 | House |
| 5,193,489 A | | 3/1993 | Hardin |
| 5,196,473 A | | 3/1993 | Valenta et al. |
| 5,303,676 A | | 4/1994 | Lawson |
| 5,317,990 A | | 6/1994 | Hughes |
| 5,339,769 A | | 8/1994 | Toth et al. |
| 5,359,961 A | | 11/1994 | Goss et al. |
| 5,386,803 A | | 2/1995 | Hughes |
| 5,421,291 A | | 6/1995 | Lawson et al. |
| 5,452,684 A | * | 9/1995 | Elazier-Davis et al. ...... 119/173 |
| 5,469,809 A | | 11/1995 | Coleman |
| 5,503,111 A | | 4/1996 | Hughes |
| 5,542,374 A | | 8/1996 | Palmer, Jr. |
| 5,577,463 A | | 11/1996 | Elazier-Davis et al. |
| 5,647,300 A | | 7/1997 | Tucker |
| 5,664,523 A | | 9/1997 | Ochi et al. |
| 5,735,232 A | | 4/1998 | Lang et al. |
| 5,743,213 A | * | 4/1998 | Fujiura .................. 119/172 |
| 5,762,023 A | | 6/1998 | Carter |
| 5,775,259 A | * | 7/1998 | Tucker .................. 119/173 |
| 5,806,462 A | | 9/1998 | Parr |
| 5,824,226 A | | 10/1998 | Boyd et al. |
| 5,836,263 A | | 11/1998 | Goss et al. |
| 5,840,113 A | | 11/1998 | Freeman et al. |
| 5,882,480 A | * | 3/1999 | Knapick et al. ............ 162/190 |
| 5,901,661 A | | 5/1999 | Pattengill et al. |
| 5,960,743 A | | 10/1999 | Taylor |
| 5,975,019 A | | 11/1999 | Goss et al. |
| 5,992,351 A | | 11/1999 | Jenkins |
| 6,020,282 A | | 2/2000 | Taylor et al. |
| 6,039,004 A | | 3/2000 | Goss et al. |
| 6,089,189 A | | 7/2000 | Goss et al. |
| 6,089,190 A | | 7/2000 | Jaffee et al. |
| 6,210,625 B1 | | 4/2001 | Matsushita et al. |
| 6,371,050 B1 | | 4/2002 | Mochizuki |
| 6,887,570 B2 | * | 5/2005 | Greene et al. ............. 428/403 |
| 6,939,387 B2 | * | 9/2005 | Elizer ...................... 71/31 |
| 2003/0148100 A1 | * | 8/2003 | Greene et al. ............. 428/403 |
| 2005/0224008 A1 | * | 10/2005 | Greene et al. ............. 119/171 |

FOREIGN PATENT DOCUMENTS

| | | |
|---|---|---|
| JP | 6-14669 | 1/1994 |
| JP | 10-262482 | 10/1998 |

* cited by examiner

| Sample | 15 min saline | | 15 min urine | | 1 hr urine | | 24 hr urine | |
|---|---|---|---|---|---|---|---|---|
| | Cl. Wt. | Cl. Str. | Cl. Wt. | Cl. Str. | Cl. Wt. | Cl. Str. | Cl. Wt. | Cl. Str. |
| A Control- Bln 75/25 scoop blend | 27.66 | 0.94 | 26.82 | 0.91 | 26.15 | 1.10 | 20.74 | 1.51 |
| | 27.72 | 0.93 | 26.85 | 0.92 | 26.29 | 1.04 | 20.79 | 1.66 |
| | 27.53 | 0.96 | 26.97 | 0.95 | 26.37 | 1.04 | 20.11 | 1.97 |
| avg. | 27.64 | 0.94 | 26.88 | | 26.27 | 1.06 | 20.55 | |
| B CMS prototype #2 | 32.95 | 1.17 | 32.04 | 0.93 | 32.27 | 1.23 | 28.52 | 7.13 |
| | 32.97 | 1.26 | 31.54 | 1.16 | 31.23 | 0.95 | 27.38 | 7.80 |
| | 32.92 | 1.10 | 32.18 | 1.11 | 32.00 | 1.21 | 27.22 | 6.02 |
| avg. | 32.95 | 1.18 | 31.92 | | 31.83 | 1.13 | 27.71 | |
| C CMS prototype #3 | 32.61 | 1.12 | 33.17 | 1.31 | 31.44 | 1.44 | 27.59 | 6.80 |
| | 32.74 | 1.42 | 33.65 | 1.29 | 28.99 | 1.09 | 27.08 | 5.81 |
| | 32.43 | 1.16 | 33.94 | 1.35 | 32.10 | 1.26 | 26.94 | 3.74 |
| avg. | 32.59 | 1.23 | 33.59 | | 30.84 | 1.26 | 27.20 | |
| D CMS prototype #4 | 32.20 | 1.38 | 32.43 | 1.06 | 30.76 | 1.09 | 26.78 | 3.29 |
| | 31.86 | 1.25 | 33.16 | 1.59 | 31.84 | 1.66 | 26.98 | 3.03 |
| | 31.53 | 1.37 | 32.07 | 1.68 | 32.42 | 1.22 | 27.50 | 4.88 |
| avg. | 31.86 | 1.33 | 32.55 | | 31.68 | 1.32 | 27.08 | |
| E CMS prototype #7 | 33.36 | 1.14 | 35.09 | 1.41 | 35.24 | 1.25 | 31.23 | 5.59 |
| | 34.37 | 1.23 | 34.61 | 1.26 | 35.43 | 1.69 | 29.45 | 3.66 |
| | 34.33 | 1.25 | 34.69 | 1.52 | 34.38 | 0.97 | 27.94 | 3.46 |
| avg. | 34.02 | 1.21 | 34.80 | | 35.02 | 1.30 | 29.54 | |
| F CMS prototype #8 | 34.62 | 1.52 | 34.76 | 1.25 | 32.97 | 0.97 | 29.78 | 4.93 |
| | 34.17 | 1.23 | 35.34 | 1.45 | 34.17 | 1.02 | 29.64 | 4.48 |
| | 34.47 | 1.21 | 35.41 | 0.94 | 33.79 | 1.58 | 27.76 | 3.69 |
| avg. | 34.42 | 1.32 | 35.17 | | 33.64 | 1.19 | 29.06 | |

Note: Standardized male urine (sp. Gr. 1.050) was used for all urine clump strength testing. 2% Saline solution was used for all saline clump testing.

CMS Prototype Samples B through F are 70.0% Seed Base produced from by-product dust, and 30.0% 200 mesh Bentonite coating powder.

FIG. 2

| A | | | B | | | C | | |
|---|---|---|---|---|---|---|---|---|
| Screen Analysis | | | Screen Analysis | | | Screen Analysis | | |
| mesh | grams | % | mesh | grams | % | mesh | grams | % |
| 8 | 0 | 0 | 8 | 76.5 | 20.1 | 8 | 52.1 | 13.1 |
| 12 | 0.8 | 0.2 | 12 | 195.4 | 51.3 | 12 | 197.7 | 49.8 |
| 14 | 3.8 | 0.9 | 14 | 83.2 | 21.9 | 14 | 105.6 | 26.6 |
| 20 | 141 | 35.1 | 20 | 18.2 | 4.8 | 20 | 16.6 | 4.2 |
| 40 | 214.6 | 53.5 | 40 | 0.7 | 0.2 | 40 | 0.4 | 0.1 |
| 50 | 33.4 | 8.3 | 50 | 0 | 0 | 50 | 0 | 0 |
| pan | 7.8 | 1.9 | pan | 6.6 | 1.7 | pan | 24.9 | 6.3 |
| Fin.Wt. | 401.4 | | Fin.Wt. | 380.6 | | Fin.Wt. | 397.3 | |

| D | | | E | | | F | | |
|---|---|---|---|---|---|---|---|---|
| Screen Analysis | | | Screen Analysis | | | Screen Analysis | | |
| mesh | grams | % | mesh | grams | % | mesh | grams | % |
| 8 | 66.5 | 16.2 | 8 | 25.2 | 6.6 | 8 | 48.5 | 12.6 |
| 12 | 220.9 | 53.7 | 12 | 174.3 | 45.5 | 12 | 195.3 | 50.8 |
| 14 | 83.1 | 20.2 | 14 | 108.3 | 28.3 | 14 | 87.2 | 22.7 |
| 20 | 17.8 | 4.3 | 20 | 53.6 | 14 | 20 | 36.9 | 9.6 |
| 40 | 0.4 | 0.1 | 40 | 5 | 1.3 | 40 | 3.4 | 0.9 |
| 50 | 0 | 0 | 50 | 1.1 | 0.3 | 50 | 0.1 | 0 |
| pan | 22.7 | 5.5 | pan | 15.8 | 4.1 | pan | 13.3 | 3.5 |
| Fin.Wt. | 411.4 | | Fin.Wt. | 383.3 | | Fin.Wt. | 384.7 | |

| Sample | Bulk Density (lbs./cu. Ft.) | Moisture (percent) |
|---|---|---|
| A | 55.8 | 6.21 |
| B | 46.6 | 9.75 |
| C | 47.5 | 6.65 |
| D | 45.9 | 5.85 |
| E | 49.2 | 7.96 |
| F | 48.9 | 8.62 |

FIG. 3

COATED CLUMPING LITTER COMPRISING NON-SWELLING PARTICLES

This application is a continuation-in-part of U.S. patent application Ser. No. 10/068,058, filed on Feb. 5, 2002 now U.S. Pat. No. 6,887,570, the disclosure of which is incorporated herein by reference.

BACKGROUND OF THE INVENTION

This invention relates generally to absorbent materials, and more specifically to, various litter compositions used for the control and removal of animal waste.

Known litter compositions are fabricated primarily from one of five materials: clay; vegetable matter such as grass, hay or alfalfa; wood chips, shavings or sawdust; and paper, such as shredded, flaked or pelletized paper, and Silica Gel. Known clay litters are prone to produce dust, and the tracking of this dust out of the litter pan by the animal. Further, production of such clay litters results in a large quantity of dust being produced, sometimes referred to as clay fines. Clay fines present a problem to litter manufacturers because the fines are a waste product and require disposal. In addition such clay products are not biodegradable.

Sodium bentonite clay is one known material used in the production of animal litters and is known for its excellent absorption and clumping qualities, as well as for odor retention. Some litter products are composed of 100% sodium bentonite. However, sodium bentonite is relatively expensive compared to other litter components. Therefore, attempts have been made to reduce the amount of sodium bentonite in clumping litters, for example, mixing pellets of non-absorbing clays with pellets of sodium bentonite clay in varying ratios. However, in these known litters, the properties which are most desirable in the sodium bentonite have been underutilized as most of the clumping and binding qualities of sodium bentonite occur at or near the surface of the clay. In 'regular' 100% bentonite litter, the granules are composed of 100% sodium bentonite. In these granules, the center typically does not swell. Therefore, in one embodiment of this invention, a swelling agent is coated on the surface of a non-swelling seed particle. Since moisture does not typically propagate to the center of individual granules, only the surface of the granule is coated with a swelling agent, resulting in a cost effective and efficient use of the swelling agent.

SUMMARY OF THE INVENTION

In one aspect, an animal litter is disclosed which comprises non-swelling particle and a swelling agent coated on the non-swelling particle.

In another aspect, an animal litter is disclosed which comprises an agglomeration of non-swelling particles coated with a swelling agent.

In another aspect, an animal litter is disclosed which comprises an agglomeration of non-swelling particles in a size range of 50 mesh to 6 mesh coated with a swelling agent.

In an embodiment, the particles have a size of up to about 40 mesh.

In still another aspect, a clumping animal litter is disclosed which comprises an agglomeration of non-swelling particles comprising clay, calcium carbonate, carbon, mica, Georgia White clay, hectorite, zeolite, smectite, opal, kaolinite, pumice, calcite, tobermite, slate, gypsum, vermiculite, halloysite, sepiolite, marls, diatomaceous earth, dolomite, attapulgite, montmorillonite, monterey shale, Fuller's earth, fossilized plant materials, perlites, and expanded perlites to form a particle seed that is coated with a swelling agent.

In still another aspect, a clumping animal litter is disclosed which comprises an agglomeration of non-swelling and swelling particles to form a seed particle that is coated with a swelling agent.

In still another aspect, a clumping animal litter is disclosed which comprises a non-swelling particle coated with a swelling agent consisting of sodium bentonite, calcium bentonite or a mixture of calcium bentonite and sodium bentonite.

In still another aspect, a clumping animal litter is disclosed which comprises a non-swelling particle coated with a swelling agent consisting of guar gum, a starch, xanthan gum, gum Arabic, gum acacia, and silica gel.

In still another aspect, a clumping animal litter is disclosed which comprises a non-swelling particle coated with a swelling agent comprising a mixture of sodium bentonite, calcium bentonite, guar gum, a starch, xanthan gum, gum Arabic, gum acacia, and silica gel.

In still another aspect, a clumping animal litter is disclosed which comprises an agglomeration of non-swelling particles of from about 325 mesh to about 40 mesh in size to form a seed particle having a size range of 50 mesh to 6 mesh and a coating comprised of swelling agent that surrounds and enrobes the seed particle.

In still another aspect, a clumping animal litter is disclosed which comprises an agglomeration of non-swelling particles of from about 325 mesh to about 40 mesh in size to form a seed particle having a size range of 50 mesh to 6 mesh and a coating comprising a powdered swelling agent that surrounds and enrobes the seed particle.

In a further aspect, a method for manufacturing a clumping animal litter is disclosed which comprises agglomerating non-swelling particles into a seed particle and coating the seed particle with a powdered swelling agent.

In yet another aspect, a clumping animal litter is disclosed which comprises an agglomeration of non-swelling clay particles from about 325 mesh to about 40 mesh in size to form a clay seed particle having a size range of 50 mesh to 6 mesh and a coating comprising a bentonite powder that surrounds and enrobes the seed particle. The powder is applied as coating in an amount of about 5% to about 40% by weight.

Additional features and advantages of the present invention are described in, and will be apparent from, the following Detailed Description of the Invention and the figures.

BRIEF DESCRIPTION OF THE FIGURES

FIG. 2 is a clumping analysis of several samples of coated clumping litter.

FIG. 3 shows a screen analysis, a bulk density, and a moisture content for each sample analyzed in FIG. 2.

DETAILED DESCRIPTION OF THE INVENTION

Before describing the invention in detail, it should be understood that this invention is not limited to the particularly exemplified systems or process parameters as described in the specification, for these parameters may of course vary. It is to be further understood that the terminology used herein is for the purpose of describing particular embodiments of the invention only, and is not intended to limit the scope of the invention in any manner for the invention in any manner.

It must be further noted that as used in this specification and the appended Claims, the singular forms "a," "an," and "the" include the plural referents unless the context clearly dictates otherwise. Thus, for example, reference to "absorbant particle" includes two or more such particles.

In addition, the term "about" as used herein and the appended Claims is intended to indicate a range of values of 10% greater and lesser than the indicated value. Thus, about 5% is intended to encompass a range of values from 4.5% to 5.5%.

The term "moisture content" as used herein and the appended Claims is defined on a per weight basis. For example, a moisture content of 20% means within a 100 pounds of material, 20 pounds will be water.

The term "mesh" or "Mesh U.S. Sieve Series" as used herein and in the appended Claims is defined by ASTM E-11 U.S.A. Standard testing Seives.

Unless defined otherwise, all technical and scientific terms have the same meaning as commonly understood by one of ordinary skill in the art to which the invention pertains. Although a number of methods and materials similar or equivalent to those described herein can be used in the practice of the present invention, the preferred materials and methods are described herein.

Figure 1:
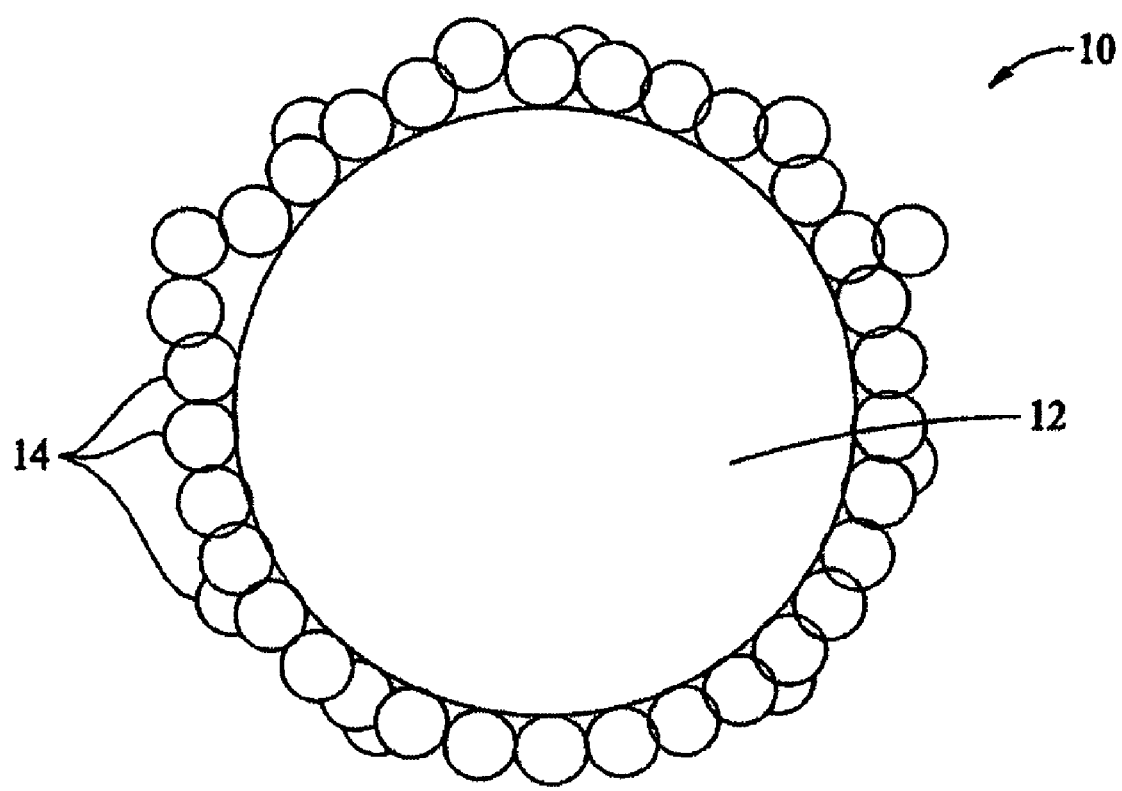
FIG. 1 is a cross sectional view of a particle of coated clumping litter.

The present invention concerns a product that absorbs moisture and a method for making the absorbant product. The product has a non-swelling seed particle coated with a swelling agent. FIG. 1 shows an absorbent particle 10. In one embodiment, absorbent particle 10 is utilized as an animal litter. In one embodiment, the animal litter is utilized for at least a dog, a cat, a hamster, a guinea pig, a ferret, a rabbit, and livestock. In another embodiment, absorbant particle 10 is a clumping animal litter. A clumping animal litter, as known in the industry, is a litter product where particles agglomerate or clump upon contact with an aqueous liquid such as urine. Clumping litter is desirable because it allows the consumer to separate and remove urine-soaked litter granules and provides a cost savings to the consumer because the entire litter does not have to be replaced. In one embodiment, absorbant particle 10 is spherical in shape. The shape shown is by way of example only as it is contemplated that a host of shapes and sizes of coated particles can be produced by the embodiments and processes described herein.

Referring to FIG. 1, absorbant particle 10 includes a non-swelling seed particle 12 coated by a swelling agent 14. The term "non-swelling" means when a particle absorbs moisture, it will not swell, expand, or increase in size or volume greater than twice the original dry volume. The term "swelling" means that a particle enlarges in size and volume when it absorbs moisture. For example, it is known in the industry that swelling bentonites contain sodium in the platy molecular structure, which causes the sodium bentonite to be able to typically expand greater than twice its original dry volume. In comparison, calcium bentonite, is known in the industry to be a non-swelling bentonite, because it has a far lower capacity to swell when wet and exhibits greater absorptive characteristics compared to sodium bentonite. In the context of this invention, a swelling particle will increase in size or volume greater than the non-swelling particle when exposed to an aqueous liquid. In one embodiment, the aqueous liquid is urine.

Non-swelling seed particle 12 includes an agglomeration of particulate fines 36, where particulate fines 36 are selected at least from a group consisting of clay, quartz, feldspar, calcium bentonite, calcite, Illite, calcium carbonate, carbon, mica, Georgia White clay, hectorite, zeolite, smectite, opal, kaolinite, pumice, calcite, tobermite, slate, gypsum, vermiculite, halloysite, sepiolite, marls, diatomaceous earth, dolomite, attapulgite, montmorillonite, monterey shale, Fuller's earth, silica, fossilized plant materials, perlites, and expanded perlites and mixtures thereof. In one embodiment, particulate fines 36 have a moisture content less than about 20%, preferably less than about 16%. The individual particulate fines 36 range in size from about 325 mesh to about 40 mesh. Once agglomerated, in one embodiment, seed particle 12 has a size range of about 50 mesh to about 6 mesh. In an embodiment, the clay particles have a size of −8 to +50 mesh. Non-swelling seed particle 12 has a moisture content ranging from about 20% to about 40%. In another embodiment, seed particle 12 comprises an agglomeration of non-swelling particles and swelling particles. The material used for the swelling particles is chosen from the group of swelling agents 14.

Swelling agent 14 is selected from at least one of a sodium bentonite, a calcium bentonite, a guar gum, a starch, a xanthan gum, a gum Arabic, a gum acacia, and a silica gel, other minerals or a mixture thereof. In one embodiment, swelling agent 14 is a powder having a moisture content of less than 20%. In a further embodiment, swelling agent 14 is a powdered bentonite having a particle size distribution such that 90% of the particles pass through 100 Mesh. In yet another embodiment, swelling agent 14 is a spray solution. In one embodiment, the spray solution includes at least 5% bentonite, up to 10% swelling agent, and 90% water. In still another embodiment, swelling agent 14 includes an odor control agent, an anti-microbial agent, an anti-sticking agent, an agent for controlling pH, a coloring agent, a de-dusting agent, a disinfectant, or combinations thereof. In a further embodiment, swelling agent 14 is a particle that can be agglomerated.

Non-swelling seed particle 12 is coated by swelling agent 14. For example, swelling agent 14 forms a coating that surrounds and enrobes non-swelling seed particle 12. A coating is defined to mean a discrete, homogeneous layer that is individually distinct from seed particle 12. Thus, in one embodiment, the coating is a discrete homogeneous layer of bentonite powder that wholly surrounds or enrobes seed particle 12.

FIGS. 2 and 3 are an analysis of several samples of coated clumping litter, which includes 70% by weight particles produced from particulate fines 36 as described above and 30% weight swelling agent 14. FIG. 2 illustrates clumping weight and clumping strength for several representative samples and is charted based upon wetting, for example, 15 minutes after wetting with a saline solution, and for 15 minutes, one hour, and 24 hours after being wetted with a standard urine sample. FIG. 3 shows a screen analysis, a bulk density, and a moisture content for each sample analyzed in FIG. 2. The screen analysis indicates a weight and a percentage for each sample that passed through standard mesh screens, for example, 8, 12, 14, 20, 40, and 50 mesh screens. It can be concluded from the data shown in FIG. 3 that as the size of the clump increases the stronger is the clump.

Figure 4:
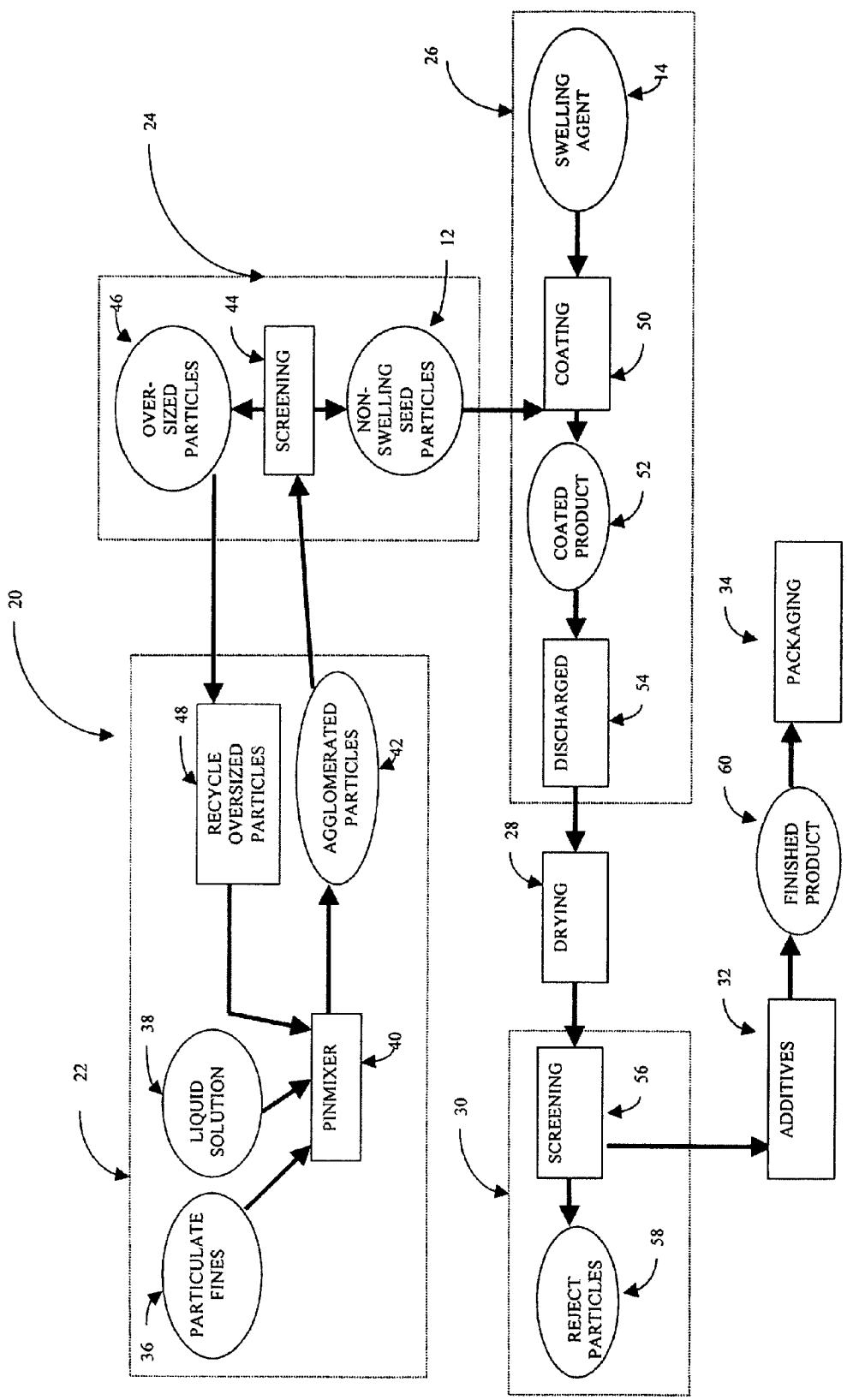
FIG. 4 shows a method of manufacturing the coated litter product of FIG. 1.

Furthermore, the data supports the fact that a decreased level of bentonite, e.g., at 30%, does not decrease the litter's ability to clump. When a plurality of absorbant particles 10 are exposed to urine, they adhere to one another or clump. In one embodiment absorbant particles 10 have a coating of sodium bentonite powder on the surface of non-swelling particles 12. The sodium bentonite powder, in one embodiment, is about 200 mesh, e.g. the consistency of fine baby powder. However, the sodium bentonite powder is composed of individual particles. When two or more absorbant particles 10 are exposed to urine, the sodium bentonite powder swells. As the sodium bentonite swells, there is a bonding interaction that occurs between the individual sodium bentonite powder particles on the surface of the two absorbant particles 10. This bonding interaction causes the absorbant particles 10 to adhere or clump. As a result, this surface-to-surface bonding interaction of the swollen sodium bentonite powder allows absorbant particles 10 to clump as strong as an animal litter composed of pure bentonite FIG. 4 shows a process 20 to produce absorbant particle 10. Process 20 includes the steps of: agglomerating 22 the initial seed material; screening 24 the moist seed particles; coating 26 seed particles with a swelling agent; drying 28 the coated seed particles; screening 30 the dried coated seed particles; addition of additives 32; and packaging 34.

Agglomerating 22 includes using a pinmixer 40 to mix particulate fines 36 with a liquid solution 38 to produce agglomerated particles 42. One specific embodiment includes recovery of waste fines that include Calcium-Montmorillonite, smectite, attapulgite, kaolin, opal and combinations thereof. In one embodiment, particulate fines 36 range in size from about 325 mesh to about 40 mesh. Particulate fines 36 are metered into pinmixer 36 at a known rate. In one embodiment, liquid solution 38 acts as a binder to particulate fines 36 and is metered into pinmixer 40. In one embodiment, liquid solution 38, applied to pinmixer 40, ranges from about 20% to about 40% by weight. In one embodiment, liquid solution 38 is water. In another embodiment, liquid solution 38 includes functional components, examples being: color, fragrance, and liquid calcium. In yet another embodiment, liquid solution 38 comprises a mixture of water and a binding agent. The binding agent is selected from a group consisting of guar gum, alginates, xanthan gum, gum acacia, gum Arabic, lignin sulfonate, carboxymethyl-cellulose, hydroxyethyl-cellulose, hydroxypropyl-cellulose, ethylhydroxyethyl-cellulose, methylhydroxyethyl-cellulose, and methylhydroxypropyl-cellulose. In one embodiment, liquid solution 38 consists of up to 10% binder and at least 90% water by weight. In another embodiment, liquid solution 38 includes water, functional components, and a binding agent.

The more moisture that is added will increase the resulting size of agglomerated particle 42. Conversely, the less moisture added, will result in a smaller size agglomerated particle 42. Preferably, the moisture added as a binder should be in the range from about 28% to about 32%. Further, the speed at which the shaft of pinmixer 40 spins affects the size of agglomerated particle 42: the greater the RPM of the shaft, the smaller the resulting agglomerated particle 42. The agglomerated fines have a moisture content ranging from about 20% to about 40%. In another embodiment, the fines have a moisture content ranging from about 28% to about 34%.

Pinmixer 40 is commercially available from FEECO International, Green Bay, Wis. Pinmixer 40 is a long, cylindrical chamber having a rotating shaft which extends axially down the center of the chamber. The rotating shaft has a plurality of metal pins attached that extend from the center of the axis vertically outward. These pins are located in a spiral pattern, running the length of the shaft. Along the cylindrical chamber are nozzles that inject liquid solution 38. As the shaft rotates within the cylindrical chamber, the pins create a horizontal vortex that imparts pressure. The pressure in combination with liquid solution 38 as a binder agglomerates the particulate fines 36 into a cake (not shown). The pins on the shaft of pinmixer 40 break up the cake into spherically shaped agglomerated particles 42. The resulting agglomerated particles 42 range from about 50 mesh to about 4 mesh in size.

By screening 24 agglomerated particles 42 a cost savings is provided: the amount of swelling agent 14 used for the coating is saved, the actual non-swelling agent, e.g. particulate fines 36, is not wasted, and the energy to coat and dry oversized particles is prevented. In one embodiment, a heated vibrating shaker screen is utilized. Typically, commercially available shaker screens are utilized. Screen 44 needs to be both heated and vibrating so agglomerated particle 42 does not stick to screen 44 and cause screen 44 to become blocked and not functional. Screening 24 eliminates oversized particles 46 from being coated. Typically, oversized particles 46 are greater than 6 mesh in size. Oversized particles 46 are recycled 48 in order to reduce waste. Particles that pass through screen 44 are non-swelling seed particles 12. In one embodiment, non-swelling seed particles 12 range in size from about 50 mesh to about 6 mesh.

After screening 44, a plurality of non-swelling seed particles 12 go through a coating process 26, which includes coating seed particles 12 with a swelling agent 14. Methods for coating 50 include utilizing at least one of a centrifugal coater. In another embodiment, a rotary system is utilized, where seed particle 12 and swelling agent 14 are tumbled in a drum. Coating process 26 is a batch process; therefore, material is not continuously fed into coater 50. During each batch, a set amount of seed particles 12 are dropped into coater 50.

In one embodiment, coater 50 works similar to a centrifuge. A batch of seed particles 12 are fed into coater 50 as coater 50 rotates. Seed particles 12 roll inside the chamber of coater 50 in the direction of rotation. Swelling agent 14 is metered into coater 50. As swelling agent 14 is metered into the chamber, it follows the path of the rolling seed particles 12. As seed particles 12 rotate, they are diverted by two plates, located 180 degrees apart within the chamber. These plates divert seed particles 12 toward the center of the chamber before centrifugal force forces them back to the walls of the chamber. This action aids in coating seed particle 12 with swelling agent 14 to results in a better coating utilizing less bentonite.

In one embodiment swelling agent 14 is a swelling clay powder. In another embodiment, swelling agent is sodium bentonite powder. In a still further embodiment, swelling agent is a mixture of sodium bentonite powder and guar gum. In a further embodiment, coating powders include at least one of a sodium bentonite powder and a blended powder comprising sodium bentonite and guar gum. As swelling agent 14 contacts seed particle 12, the moisture of seed particle 12 causes swelling agent 14 to swell or gelatinize and adhere to seed particle 12. As seed particle 12 rolls around the chamber, swelling agent 14 adheres to the surface of seed particle 12 to form a discrete coating.

Once a uniform coating has been applied, the coated article (not shown) is allowed to continue to roll within the chamber to allow swelling agent 14 to become compressed or packed around seed particle 12 becoming a coated particle 52. In one embodiment, the coating is about 5% to about 40% by weight of coated particle 52. In an alternative embodiment, the coating is a sodium bentonite coating that is about 20% to about 35% by weight of coated particle 52. In a further embodiment, the coating is a sodium bentonite coating that is 30% by weight of coated particle 52. In one embodiment, the coating is a silica and sodium bentonite coating that is about 30% to about 40% by weight of coated product 52. In yet another embodiment, the coating is a sodium bentonite powder and guar gum coating that is about 15% to about 25% by weight of coated product 52. Once coated, coated particle 52 is discharged 52, as a batch, through a side ejection hatch (not shown) via centrifugal force, and the process is repeated.

In an alternative method, agglomerated particles 42 are placed in a fluidized bed and a bentonite coating is sprayed in a dilute concentration solution to produce coated particle 52. In one embodiment the dilute solution comprises less than 5% bentonite and 95% water.

After being discharged 52, coated product 52 is transferred to a dryer 28. Drying 28 removes moisture from the coated particle without removing swelling agent 14 or damaging finished product 52. Drying 28 can be accomplished by a variety of commercially available dryer technologies. In one embodiment, a rotary drum dryer is utilized. In another embodiment, a fluidized bed dryer is utilized. Typically, in one embodiment, coated product 52 is dried to have a moisture content less than 30%. This can be accomplished by heating coated product 52 in the range of about 200° to about 800° Fahrenheit. More specifically, coated product 52 is heated to about 300° to about 400° Fahrenheit. In another embodiment, coated product 52 is dried to have a moisture content ranging from about 15% to about 25%; and in yet another embodiment a moisture content ranging from about 6% to about 12%. An over-dried product has a moisture content of less than 5%. At 5%, performance begins to degrade because the ability of bentonite to absorb water and swell is reduced. This degredation decreases the ability of the litter to clump, which affects the strength of the overall clump.

After drying process 28, another screening process 30 takes place. This step uses a vibrating screen 54 to remove coated particles larger than a mesh size of about 8. Particles larger than a mesh size of about 8 detrimentally affect product performance because these larger particles allow moisture to channel more easily through the litter. As known in the art, channelling occurs when urine penetrates readily through the litter resulting in a long, thin clump that runs from the top of the litter bed to the bottom of the litter pan. If the urine can easily pass all the way through the litter then a sticky clump or residue can form on the bottom of the pan underneath the actual litter. Channelling results in clumps that are irregular and difficult to remove. Further, such clumps are more susceptible to breakage during removal. In one embodiment, the resulting finished product 60 has a range of about 8 mesh to about 50 mesh in size. In one embodiment finished product 60 has a moisture content from about 5% to about 15%. In another embodiment, finished product 60 has a moisture content of about 6% to about 10%. In a specific embodiment, finished product 60 has a moisture content of about 8%.

Once a uniform size of coated particles has been established, additives 32 are applied. Additives 32 includes an odor control agent, a fragrance, an anti-microbial agent, an anti-sticking agent, an agent for controlling pH, a powder for coloring, a dye, a coloring agent, addition of colored particles, a de-dusting agent, a disinfectant, or combinations thereof. In one embodiment, the coated particles are further coated with a colorant. A finished product 60 consists of a mixture of colored particles and non-colored particles. In one embodiment, up to 5% w/w of the coated particles are colored. Once additives 32 are include, the product is ready to be packaged 34.

The animal litter resulting from the compositions and methods described above has superior clumping properties as the active clumping agent, e.g. swelling agent 14, is kept on the surface of the particles, where the clumping bonds are formed. In addition, the litter has a dust content, e.g., particles sized less than about 60 mesh are 'dust', which is lower than known clumping litters. The drying process removes the majority of particles sized under about 60 mesh.

In the above described embodiments, coating with swelling agent 14 provides a litter which includes the clumping and absorption qualities of a litter which is composed solely of sodium bentonite. However, due to the process 20 that produces absorbant particle 10, the amount by weight of a swelling agent utilized is reduced over known clumping litters. In one embodiment, this results in more efficient use of the sodium bentonite while providing a production cost savings over those litters with higher percentage amounts of sodium bentonite. In addition, the coated litter produced provides a lighter weight product compared to products manufactured with 100% sodium bentonite. Further the coated litter has a unique, homogeneous appearance that appeals to consumers. Further, agglomeration process 22 results in a utilization of clay product fines 36, which heretofore have been considered waste products, and since clay is not biodegradable, clay fines have traditionally required space for disposal.

Without departing from the spirit and scope of this invention, one of ordinary skill can make various changes and modifications to the invention to adapt it to various usages and conditions, *mutatis mutandis*. As such, these changes and modifications are properly, equitably, and intended to be, within the full range of equivalence of the following claims.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An animal litter comprising:
   non-swelling particles that have been agglomerated in a pin mixer, said non-swelling particles having a size range of about −10 to about +50 mesh, said non-swelling particles are selected from the group consisting of clay, quartz, feldspar, calcium bentonite, calcite, illite, calcium carbonate, carbon, mica, Georgia white clay, hectorite, smectite, opal, kaolinite, pumice, tobermite, slate, gypsum, vermiculite, halloysite, sepiolite, marls, diamomaceous earth, dolomite, attapulgite, montmorillonite, Monterey shale, Fuller's earth, silica, fossilized plant materials, perlites, expanded perlites, and mixtures thereof; and
   a swelling agent having a size range of about 60 mesh to about 300 mesh coated on said non-swelling particles, wherein said swelling agent has a particle size distribution such that at least 90% of the particles pass through 100 mesh and said swelling agent is selected from the group consisting of bentonite, sodium bentonite, calcium bentonite, guar gum, starch, xantham gum, gum Arabic, gum acacia, silica gel, and mixtures thereof, wherein the swelling agent includes an additive selected from the group consisting of an odor control agent, a fragrance, an anti-microbial agent, an anti-sticking agent, an agent for controlling pH, a powder for coloring, a dye, a coloring agent, colored particles, a dedusting agent, a disinfectant and combinations thereof.

2. An animal litter according to claim 1 wherein said non-swelling particles comprise clay.

3. An animal litter according to claim 2 wherein said clay comprise at least one component selected from the group consisting of Calcium-Montmorillonite, smectite, attapulgite, halloysite, kaolin, and opal fines.

4. An animal litter according to claim 1 wherein said swelling agent is a powder.

5. An animal litter according to claim 1 wherein said swelling agent is about 20% to about 40% by weight.

6. An animal litter according to claim 1 wherein said swelling agent is a spray solution.

7. An animal litter according to claim 6 wherein said spray solution comprises water and the swelling agent.

8. A clumping animal litter comprising:

non-swelling clay particles in the range of −8 to +50 mesh having a moisture content from about 20% to about 40%, comprising agglomerated clay fines that have been agglomerated in a pin mixer; and a coating for said non-swelling clay particles comprising bentonite particles, wherein the bentonite particles have a size distribution such that at least 90% of the bentonite particles pass through 100 mesh and the coating includes an additive selected from the group consisting of an odor control agent, a fragrance, an anti-microbial agent, an anti-sticking agent, an agent for controlling pH, a powder for coloring, a dye, a coloring agent, colored particles, a de-dusting agent, a disinfectant and combinations thereof.

9. A clumping animal litter according to claim 8 wherein said coating comprises an agent selected from the group consisting of sodium bentonite, calcium bentonite, guar gum, starch, xantham gum, gum Arabic, gum acacia, silica gel, and mixtures thereof.

10. A clumping animal litter according to claim 8 wherein said coating comprises at least bentonite and guar gum.

11. A clumping animal litter according to claim 8 wherein said coating is applied as a spray solution.

12. A clumping animal litter according to claim 8 wherein said clay particles comprise Calcium-Montmorillonite fines.

13. A clumping animal litter according to claim 8 wherein said coating comprises a powder.

14. A clumping animal litter according to claim 8 wherein said litter has a moisture content of less than 30%.

15. A clumping animal litter according to claim 8 wherein said coating is from about 20% to about 40% by weight of said litter.

16. A clumping animal litter according to claim 8 wherein said coating has a moisture content of less than 20%.

* * * * *